(12) United States Patent
Ham et al.

(10) Patent No.: US 8,676,416 B2
(45) Date of Patent: Mar. 18, 2014

(54) SYSTEM AND METHOD FOR STARTING FUEL CELL VEHICLE IN EMERGENCY

(75) Inventors: Sung Gyu Ham, Gyeonggi-do (KR); Kyung Won Suh, Seoul (KR); Seo Ho Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 268 days.

(21) Appl. No.: 12/948,527

(22) Filed: Nov. 17, 2010

(65) Prior Publication Data

US 2012/0053766 A1 Mar. 1, 2012

(30) Foreign Application Priority Data

Aug. 31, 2010 (KR) ........................ 10-2010-0084458

(51) Int. Cl.
*G06F 7/00* (2006.01)
*G06F 17/00* (2006.01)
*B60L 3/00* (2006.01)
*B60L 11/18* (2006.01)

(52) U.S. Cl.
USPC .............................. 701/22; 429/432; 417/411

(58) Field of Classification Search
USPC ........ 701/22; 180/65.1; 307/46, 320; 62/126, 62/230; 417/411; 429/432
See application file for complete search history.

(56) References Cited

U.S. PATENT DOCUMENTS

| 3,681,609 A | * | 8/1972 | Boese et al. ..................... 290/16 |
| 5,595,064 A | * | 1/1997 | Ikeda et al. ..................... 62/126 |
| 6,616,424 B2 | * | 9/2003 | Raiser ........................... 417/411 |
| 6,815,103 B2 | * | 11/2004 | Abe et al. ....................... 429/429 |
| 7,344,788 B2 | * | 3/2008 | Clingerman et al. ......... 429/429 |

(Continued)

FOREIGN PATENT DOCUMENTS

| JP | 07170613 A | 7/1995 |
| JP | 2002-158026 A | 5/2002 |

(Continued)

OTHER PUBLICATIONS

Short and long term energy source technologies for electrically-heated catalysts; Bass, E.A. ; Johnston, R. ; Hunt, B. ; Rodriguez, G. ; Gottberg, I. ; Izhizuka, A. ; Hall, W.; Energy Conversion Engineering Conf, 1996. IECEC 96., Proc of the 31st Intersociety; vol. 3; Digital Object Id: 10.1109/IECEC.1996.553394 ; Pub. 1996 , pp. 1905-1912 vol. 3.*

(Continued)

*Primary Examiner* — Cuong H Nguyen
(74) *Attorney, Agent, or Firm* — Edwards Wildman Palmer LLP; Peter F. Corless

(57) ABSTRACT

The present invention provides a system and method for starting a fuel cell vehicle in an emergency, which can start the fuel cell by supplying necessary air to the fuel cell even in the event of a failure or malfunction of a high voltage system, the high voltage system including a high voltage DC-DC converter and a high voltage battery which are generally used as a power source of an air blower during start-up of the fuel cell. In particular, the present invention provides a system and method for starting a fuel cell vehicle in an emergency, in which a controller drives an air blower by a voltage output from a low voltage battery to start the fuel cell in an emergency, if it is determined that there is a failure or malfunction in the high voltage system during start-up of a fuel cell system.

2 Claims, 3 Drawing Sheets

(56) References Cited

U.S. PATENT DOCUMENTS

| | | | |
|---|---|---|---|
| 7,473,480 B2* | 1/2009 | Rainville et al. | 429/413 |
| 2002/0064695 A1* | 5/2002 | Raiser | 429/13 |
| 2007/0216390 A1* | 9/2007 | Wai et al. | 323/351 |
| 2008/0081224 A1 | 4/2008 | Burch et al. | |
| 2009/0081502 A1 | 3/2009 | Alp et al. | |
| 2009/0309421 A1* | 12/2009 | Angquist et al. | 307/46 |
| 2010/0028727 A1 | 2/2010 | Hortop et al. | |

FOREIGN PATENT DOCUMENTS

| | | | | |
|---|---|---|---|---|
| JP | 2005259692 A | | 9/2005 | |
| JP | 2007149621 A | | 6/2007 | |
| JP | 2008084628 A | | 4/2008 | |
| KR | 10-2008-0086941 A | | 9/2008 | |
| KR | 2012020686 A | * | 3/2012 | |

OTHER PUBLICATIONS

American National Standard Dictionary of Electromagnetic Compatibility (EMC) including Electromagnetic Environmental Effects (E3); ANSI Std C63.14-2009; Digital Object Identifier: 10.1109/IEEESTD.2009.5291662. Publication Year: 2009 , pp. 1-46.*

Optimization of EMC management plan for BOP(Balance of Plant) of fuel cell electric vehicle(FCEV); Jeakon Shin ; Soonyong Lee ; Kibum Jung ; Jaehoon Choi; Electromagnetic Compatibility (APEMC), 2010 Asia-Pacific Symposium on; Digital Object Identifier: 10.1109/APEMC.2010.5475552; Publication Year: 2010 , pp. 1435-1438.*

Multi-objective optimization and comparative evaluation of Si soft-switched and SiC hard-switched automotive DC-DC converters Waffler, S. ; Preindl, M. ; Kolar, J.W.; Industrial Electronics, 2009. IECON '09. 35th Annual Conference of IEEE; Digital Object Identifier: 10.1109/IECON.2009.5415123; Publication Year: 2009 , pp. 3814-3821.*

Design and protection of a high voltage DC onboard grid with integrated fuel cell system on more electric aircraft; Lucken, A. ; Brombach, J. ; Schulz, D.; Electrical Systems for Aircraft, Railway and Ship Propulsion (ESARS), 2010; Digital Object Identifier: 10.1109/ESARS.2010.5665245; Publication Year: 2010 , pp. 1-6.*

Modeling and characterization of an aircraft electric power system with a fuel cell-equipped APU connected at HVDC bus; Eid, A. ; El-Kishky, H. ; Abdel-Salam, M. ; El-Mohandes, T.; Power Modulator and High Voltage Conference (IPMHVC), 2010 IEEE International; Digital Object Id.: 10.1109/IPMHVC.2010.5958440; Pub. Yr: 2010 , pp. 639-642.*

* cited by examiner

SYSTEM AND METHOD FOR STARTING FUEL CELL VEHICLE IN EMERGENCY

CROSS-REFERENCE TO RELATED APPLICATION

This application claims under 35 U.S.C. §119(a) the benefit of Korean Patent Application No. 10-2010-0084458 filed Aug. 31, 2010, the entire contents of which are incorporated herein by reference.

BACKGROUND (a) Technical Field

The present disclosure relates to a system and method for starting a fuel cell vehicle, particularly for starting a fuel cell vehicle in an emergency. More particularly, a system and method is provided for starting a fuel cell vehicle in an emergency in the event of a failure or malfunction of a high voltage system which can include a high voltage DC-DC converter and a high voltage battery.

(b) Background Art

As well known in the art, a hydrogen fuel cell vehicle employs a fuel cell system which comprises a fuel cell stack for generating electricity by an electrochemical reaction of reactant gases; a hydrogen supply system for supplying hydrogen as a fuel to the fuel cell stack; an air supply system for supplying oxygen-containing air as an oxidant required for the electrochemical reaction in the fuel cell stack; a thermal management system for removing reaction heat from the fuel cell stack to the outside of the fuel cell system, controlling operation temperature of the fuel cell stack, and performing water management function; and a system controller for controlling the overall operation of the fuel cell system.

In a vehicle equipped with the fuel cell system, if the fuel cell is used as the only power source, the fuel cell powers all loads of the vehicle. This results in performance deterioration during operation when the efficiency of the fuel cell is low. Moreover, if a sudden load is applied to the vehicle, sufficient power often can not be supplied to a drive motor, which reduces the performance of the vehicle (for example, a sudden change in load imposes a heavy burden on the fuel cell since electricity is generated in the fuel cell by an electrochemical reaction).

Furthermore, a fuel cell has unidirectional output characteristics. Thus, if there is no separate storage means, it is difficult to recover energy from the drive motor during braking of the vehicle. As a result, efficiency of the vehicle system is decreased.

In an attempt to address these drawbacks, fuel cell hybrid vehicles have been developed. Such fuel cell hybrid vehicles preferably include both large vehicles such as buses as well as small vehicles. In addition to a fuel cell as a main power source, a fuel cell hybrid vehicle can be further equipped with a suitable storage means such as a high voltage battery or a supercapacitor as an auxiliary power source for providing suitable power required for driving the motor.

In particular, in a fuel cell-battery hybrid vehicle, a fuel cell used as a main power source and a high voltage battery used as an auxiliary power source are connected in parallel, and a low voltage battery (e.g., 12 V auxiliary battery) for driving low voltage components of the vehicle is further provided in addition to the high voltage battery (as a main battery). Accordingly, the fuel cell-battery hybrid vehicle can be equipped with two types of batteries such as the high voltage battery and the low voltage battery.

During start-up of the fuel cell, it is necessary to supply the fuel cell with air as well as hydrogen as reactant gases. However, high voltage components such as an air blower cannot be driven by the power of the fuel cell before the fuel cell reaches a normal operating state. Thus, oxygen-containing air is supplied to the fuel cell as an oxidant by driving the air supply system (e.g. air blower) by power from the high voltage battery in a state where a hydrogen supply valve (which starts and stops the hydrogen supply) is opened to supply the fuel cell with hydrogen (as a fuel) from a hydrogen tank.

FIG. 1 is a diagram illustrating the problems associated with the prior art. As shown, an electrical connection is provided between a fuel cell 10, an air blower 40, a high voltage DC-DC converter (HDC) 21 and a high voltage battery 20, which are used to supply power for driving the air blower 40 during start-up of the fuel cell 10. As shown in the figure, the fuel cell 10 and the high voltage battery 20 are connected in parallel to the air blower 40 as a high voltage component in a fuel cell system. A high voltage bus 30 is provided at an output side of the fuel cell 10. The high voltage battery 20 is further connected to an inverter 41 as a power module for rotating a motor M of the air blower 40.

In a typical fuel cell vehicle, it is necessary to supply power to the inverter 41 of the air blower 40 for supplying air (oxygen) to the fuel cell during start-up of the fuel cell 10. Thus, the high voltage of the high voltage battery 20 is boosted by the high voltage DC-DC converter 21, and is supplied to the inverter 41 of the air blower 40. Then, the inverter 41 inverts the phase of the voltage and drives the motor M of the air blower 40. As such, when the fuel cell 10 is started by driving the air blower 40 by the power of the high voltage battery 20, the air blower 40 is then driven by the power of the fuel cell 10 to supply necessary air to the fuel cell 10.

However, according to the above-described conventional fuel cell system, in the event of a failure or malfunction of a high voltage system, which includes the high voltage DC-DC converter 21 and the high voltage battery 20 (which drives the air blower 40 during start-up of the fuel cell 10), it is impossible to drive the air blower 40 to supply air to the fuel cell 10 during start-up, and thus the fuel cell 10 cannot be started.

In particular, according to such conventional systems, the drive power is supplied to the inverter of the air blower by the voltage output from the high voltage battery, and the voltage is boosted by the high voltage DC-DC converter during start-up of the fuel cell. Thus, the dependence on the high voltage system is absolutely high, which reduces the reliability of the system.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a system and method for starting a fuel cell vehicle, particularly in an emergency. In particular, the present invention provides a system and method which can start a fuel cell in an emergency by supplying air to the fuel cell even in the event of a failure or malfunction of a high voltage system, wherein the high voltage system includes a high voltage DC-DC converter and a high voltage battery.

In one aspect, the present invention provides a system for starting a fuel cell vehicle in emergency by driving an air blower and supplying hydrogen to the fuel cell. In a preferred embodiment, the system includes: a circuit provided between an output terminal of a low voltage battery and the air blower such that the air blower is driven by a voltage output from the low voltage battery; a mechanism, such as a switch provided in the circuit to control the output voltage of the low voltage battery; and a controller for turning on the mechanism/switch such that the air blower is driven by the voltage output from the low voltage battery, if start-up of the fuel cell is detected and a failure or malfunction of the high voltage system is detected.

In another aspect, the present invention provides a method for starting a fuel cell vehicle in emergency, the method including: if a start-up of a fuel cell system is detected, determining, e.g. at a controller, whether there is a failure or malfunction in the high voltage system, wherein the high voltage system includes a high voltage DC/DC converter and a high voltage battery; if it is determined that there is a failure or malfunction in the high voltage system, turning on a mechanism, such as a switch provided in the circuit between an output terminal of a low voltage battery and an air blower, such that the air blower is driven by a voltage output from the low voltage battery; and allowing the air blower driven by the voltage of the low voltage battery to supply air to the fuel cell, while hydrogen is also supplied to the fuel cell, thereby starting the fuel cell.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
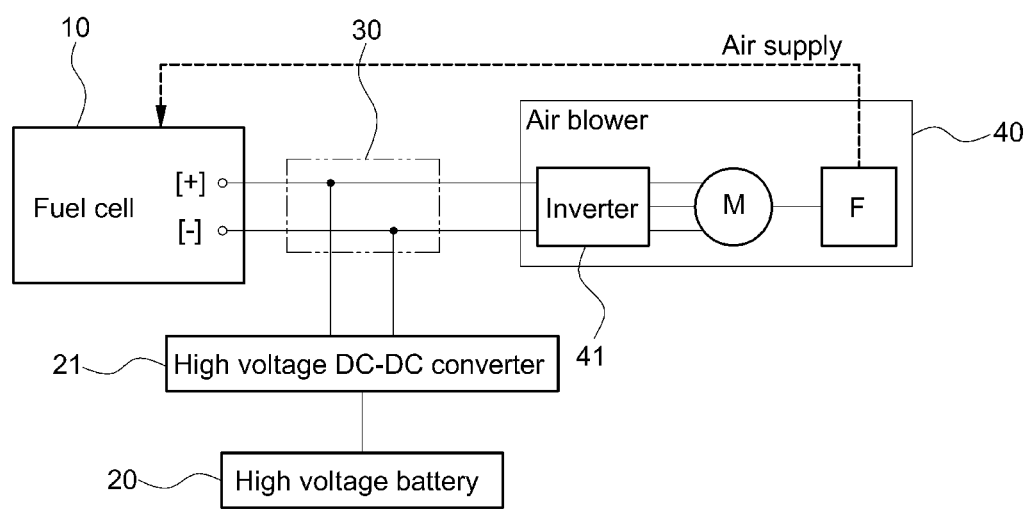
FIG. 1 is a diagram illustrating the problems associated with prior art systems which include an electrical connection between a fuel cell, an air blower, a high voltage DC-DC converter, and a high voltage battery.

Reference numerals set forth in the Drawings includes reference to the following elements as further discussed below:

| 10: fuel cell | 20: high voltage battery |
| 21: high voltage DC-DC converter | 30: high voltage bus |
| 32: first switch | 35: second switch |
| 40: air blower | 41: inverter |
| 50: low voltage battery | 60: controller |
| 70: voltage sensor | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention solves the prior art problem in which a fuel cell cannot be started in the event of a failure or malfunction of a high voltage DC-DC converter and a high voltage battery during start-up of the fuel cell. In particular, the present invention provides a method and system to supply power to an inverter of an air blower, which supplies air to the fuel cell. In a preferred embodiment, the present method and system start the fuel cell in an emergency by supplying necessary air to the fuel cell in the event of a failure or malfunction of a high voltage system (including a high voltage DC-DC converter and a high voltage battery), during start-up of the fuel cell. In contrast with prior methods, the present systems and methods do not rely upon voltage output from the high voltage battery and voltage boosted by the high voltage DC-DC converter as a power source of the air blower.

In accordance with a preferred embodiment, the system and method of the present invention is configured to start the fuel cell, such as in an emergency, using a low voltage battery (e.g., 12 V auxiliary battery) in the event of a failure or malfunction of the high voltage DC-DC converter or the high voltage battery. In an exemplary embodiment, a high voltage bus at an input side of the air blower and a power terminal of the low voltage battery (e.g., 12 V auxiliary battery) are connected by a switch and a diode such that the air blower is driven by the power of the low voltage battery to start the fuel cell.

Figure 2:
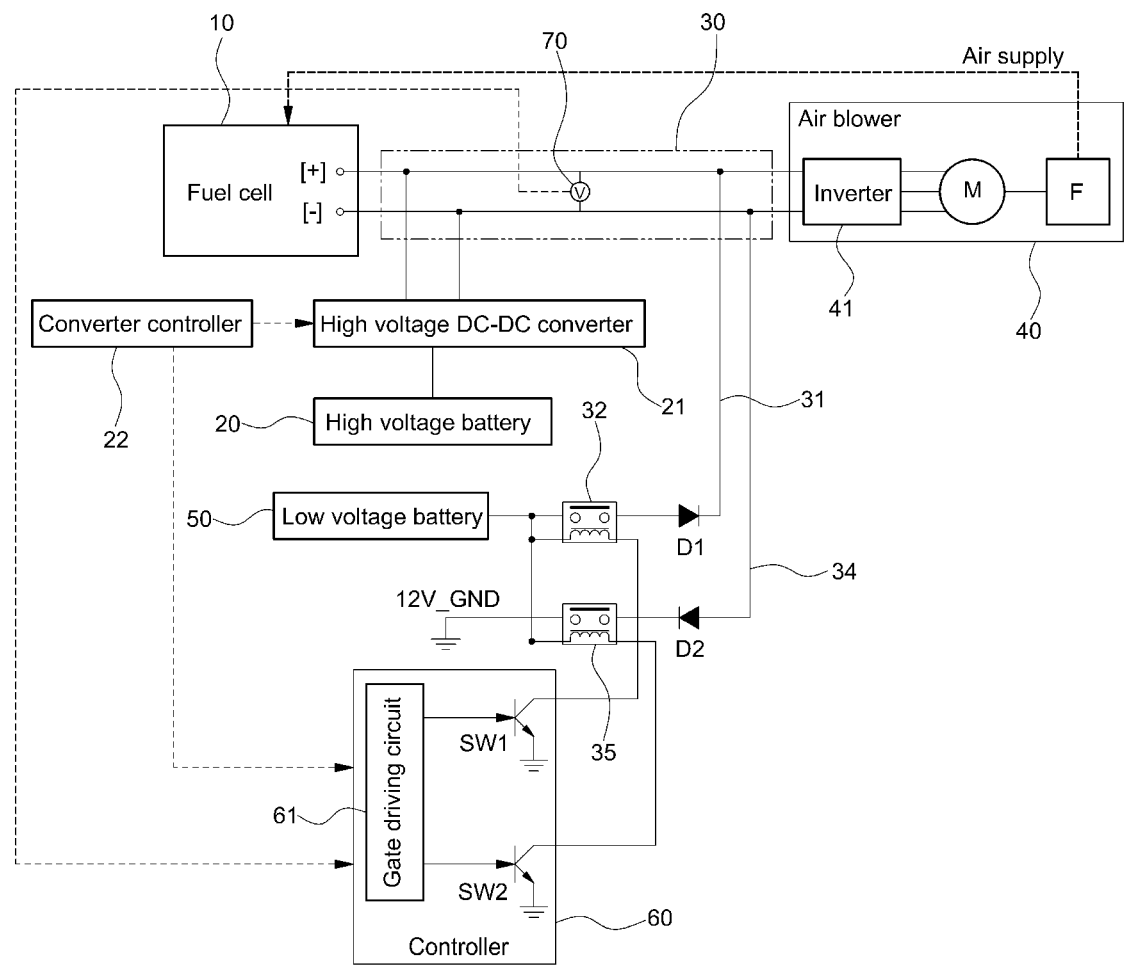
FIG. 2 is a diagram showing the configuration of a system for starting a fuel cell vehicle in an emergency in accordance with a preferred embodiment of the present invention.
Figure 3:
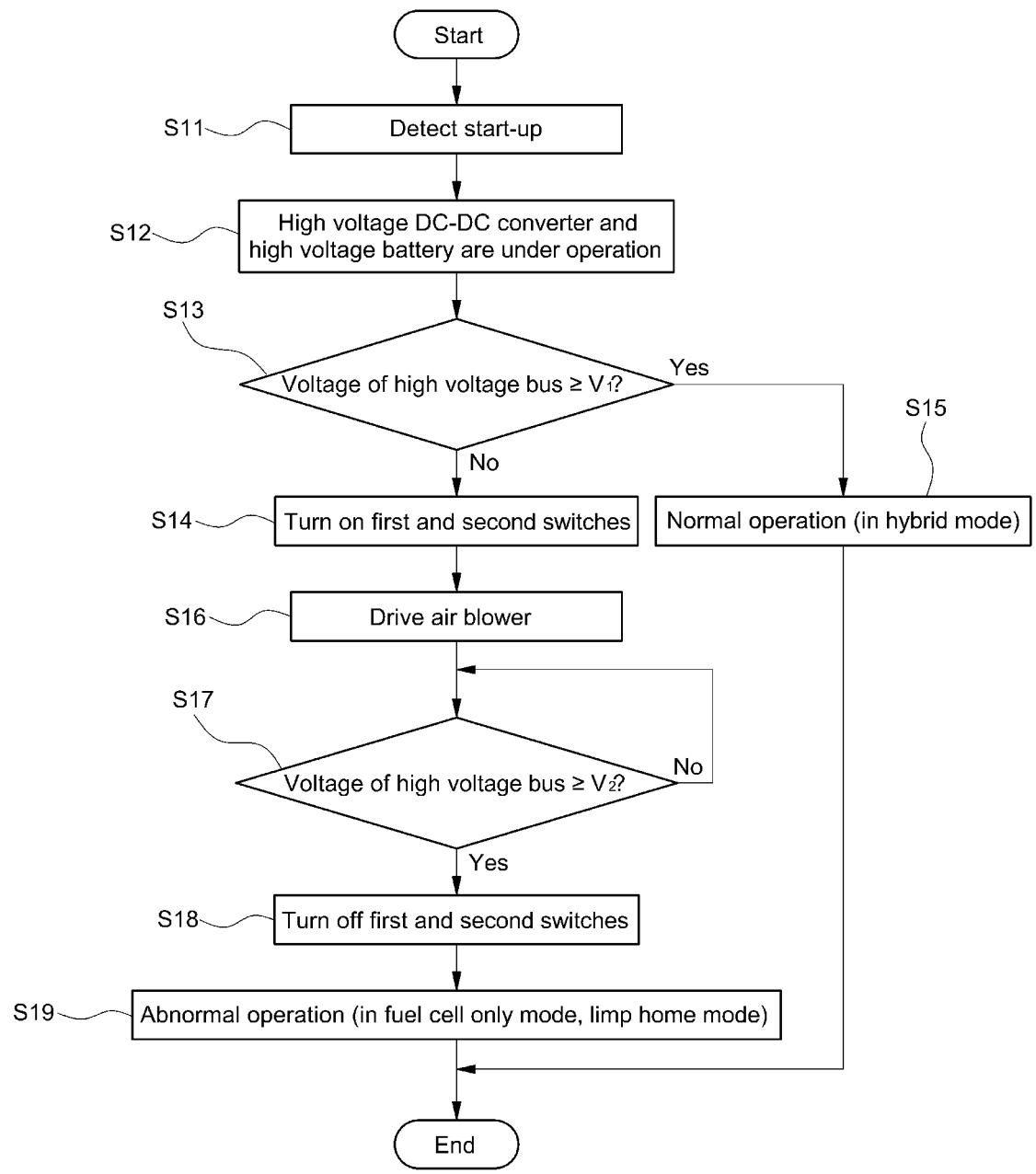
FIG. 3 is a flowchart showing a method for starting a fuel cell vehicle in emergency in accordance with another preferred embodiment of the present invention.

FIG. 2 is a diagram showing the configuration of a system for starting a fuel cell vehicle in accordance with a preferred embodiment of the present invention, and FIG. 3 is a flowchart showing a method for starting a fuel cell vehicle in accordance with another preferred embodiment of the present invention.

As shown in the figures, a fuel cell 10 and a high voltage battery 20 are connected in parallel to an air blower 40 as a high voltage component. A high voltage bus 30 is provided at an output side of the fuel cell 10. The high voltage battery 20 (i.e., an input side of the air blower 40) is in connection with an inverter 41 as a power module for rotating a motor M of the air blower 40.

Preferably, a circuit is connected between an output terminal of a low voltage battery 50 and the air blower 40 such that the air blower 40 is driven by a voltage output from the low voltage battery 50, and a switch 32 for controlling the output voltage of the low voltage battery 50 is provided in the circuit.

In an exemplary embodiment, the high voltage bus 30 connecting the output terminal of the low voltage battery 50, the fuel cell 10, and the air blower 40 is connected to a circuit 31. A first switch 32 for selectively controlling the current output from the low voltage battery 50 (controlling the output voltage) and a first blocking diode D1 for preventing reverse current from flowing from the high voltage bus 30 to the low voltage battery 50 are further provided in the circuit 31 connected to the high voltage bus 30.

Preferably, a second switch 35 for selectively controlling the current flowing to a ground and a second blocking diode D2 for preventing current from flowing in a reverse direction are further provided in a circuit 34 which is connected between the high voltage bus 30 and the ground.

In accordance with this embodiment, the first switch 32, the second switch 35, the first blocking diode D1, and the second blocking diode D2 are provided to selectively control the low voltage side and the high voltage side. In particular, the first blocking diode D1 is preferably configured to block the current flowing from the high voltage bus 30 to the low voltage battery 50 in a reverse direction, thus protecting the low voltage battery 50.

In a preferred embodiment, a controller 60 is provided for controlling the on/off operation of the first and second switches 32 and 35. Preferably, the controller 60 is configured to turn on the first and second switches 32 and 35 in response to an input signal in the event of a failure or malfunction of the high voltage DC-DC converter 21 or the high voltage battery 20.

In the embodiment shown in FIG. 2, a controller 60 including semiconductor switches SW1 and SW2 is provided in connection between exciting coils of the first and second switches 32 and 35, which are connected to the output terminal of the low voltage battery 50 and the ground. As shown, the controller 60 can further include a gate driving circuit 61 for turning on the semiconductor switches SW1 and SW2 in response to an input signal (e.g. in the event of a failure or malfunction of the high voltage DC-DC converter 21 or the high voltage battery 20).

Therefore, if the controller 60 detects a failure or malfunction of the high voltage system (which includes the high voltage DC-DC converter 21 and the high voltage battery 20), the controller 60 outputs a signal for turning the first and second switches 32 and 35 on (i.e., current is applied to the exciting coils by the turning on of the semiconductor switches), and thus the inverter 41 of the air blower 40 receives the voltage of the low voltage battery 50 to drive the motor M of the air blower 40. When the motor M of the air blower 40 is driven, air is thus supplied to the fuel cell 10 (e.g. by rotation of a blower fan F).

In accordance with a preferred system and method, the series of processes in which the controller 60 detects a failure or malfunction of the high voltage DC-DC converter 21 or the high voltage battery 20 and turns on the first and second switches 32 and 35, and the air blower 40 is driven by the voltage of the low voltage battery 50, are performed only during start-up of the fuel cell 10 and in the event of a failure or malfunction of the high voltage system (such as the high voltage DC-DC converter 21, the high voltage battery 20, etc.).

In a preferred embodiment, the controller 60 analyzes a key signal to detect the start-up of the fuel cell system and, if a failure or malfunction of the high voltage system (such as the high voltage DC-DC converter 21, the high voltage battery 20, etc.) is detected, the controller 60 turns on the first and second switches 32 and 35 such that the air blower 40 is driven by the voltage of the low voltage battery 50.

In an exemplary embodiment, the controller 60 may detect the failure or malfunction of the high voltage DC-DC converter 21 or the high voltage battery 20 by receiving a diagnosis signal for the high voltage system (such as the high voltage DC-DC converter 21, the high voltage battery 20, etc.) from a controller 22 (hereinafter referred to as a converter controller) which controls the operation of the high voltage DC-DC converter 21, or by receiving a signal from a failure detector which detects a failure of the high voltage system.

Generally, in a fuel cell system, the converter controller 22 is configured to determine whether there is a failure or malfunction in the high voltage system (such as the high voltage DC-DC converter 21, the high voltage battery 20, etc.) by a self-diagnosis process. Therefore, in accordance with some embodiments of the present invention, the controller 60 can be configured to receive the diagnosis signal from the converter controller 22 to determine whether there is a failure or malfunction in the high voltage system. Further, if it is determined that there is a failure or malfunction, the controller 60 can further be configured to turn on the first and second switches 32 and 35 such that the air blower 40 is driven by the voltage of the low voltage battery 50. As a result, air can be supplied to the fuel cell 10, to thereby start the fuel cell 10 in an emergency.

In some embodiments, if the failure or malfunction of the high voltage DC-DC converter 21 or the high voltage battery 20 is detected by a failure detector, the controller 60 can be configured to turn on the first and second switches 32 and 35 to start the fuel cell 10 in an emergency. The failure detector may be any known type of detector, such as a voltage sensor 70 configured to detect a voltage output from the high voltage system to the air blower 40. In a preferred embodiment, a voltage sensor 70 is provided in the high voltage bus 30 as shown in FIG. 2. If the voltage of the high voltage bus 30 detected by the voltage sensor 70 is lower than a predetermined reference voltage $V_1$, the controller 60 determines that there is a failure, and turns on the first and second switches 32 and 35. If the voltage of the high voltage bus 30 detected by the voltage sensor 70 is higher than the reference voltage $V_1$, the controller 60 maintains the first and second switches 32 and 35 in an off state (normal start-up by the power of the high voltage battery and the boost operation of the converter).

For fuel-cell start-up, it is necessary to supply hydrogen as a fuel to the fuel cell 10. In preferred embodiments, a hydrogen supply valve or the like (for starting and stopping the supply of hydrogen gas, not shown) can be driven by the power of the low voltage battery 50 during start-up of the fuel cell 10. In accordance with the systems and methods of the present invention, a separate device for supplying hydrogen in an emergency is not required. In particular, when the fuel cell system is turned on, the hydrogen supply valve can be opened to supply hydrogen and, in this state, the air blower 40 is also driven by the low voltage battery 50 to supply air required for the start-up of the fuel cell 10.

Because the drive power required by the motor M of the air blower 40 for the initial start-up of the fuel cell 10 is small, it is possible to drive the motor M of the air blower 40 by the power of the low voltage battery 50, and thereby start the fuel cell 10 by the power of the low voltage battery 50 in an emergency.

In accordance with a preferred embodiment, if a voltage above a predetermined level is output from the fuel cell 10 after the start-up, the controller 60 can be configured to turn off the first and second switches 32 and 35 such that the air blower 40 is driven by the power of the fuel cell 10 (rather than the low voltage battery 50). In particular, if the detected voltage value of the voltage sensor 70 at the high voltage bus 30 (i.e., the voltage output from the fuel cell 10 to the air blower 40 through the high voltage bus 30) exceeds a predetermined reference voltage $V_2$, the controller 60 determines that a voltage above a predetermined level is output from the fuel cell 10, and the controller 60 turns off the first and second switches 32 and 35.

Next, a method for starting the fuel cell vehicle in an emergency in accordance with another preferred embodiment of the present invention will be described in detail with reference to FIG. 3.

FIG. 3 shows an embodiment for determining whether there is a failure or malfunction in the high voltage DC-DC converter 21 or the high voltage battery 20, based on the detection value of the voltage sensor 70 for detecting the output voltage of the high voltage system (i.e., the voltage of the high voltage bus).

First, if a start-up is detected from a key signal input (S11), in a state where the high voltage DC-DC converter 21 and the high voltage battery 20 are operated (S12), the controller 60 determines whether there is a failure or malfunction in the high voltage system (the high voltage system including the high voltage DC-DC converter 21 and the high voltage battery 20). In particular, the controller 60 determines whether there is a failure or malfunction based on the voltage of the high voltage bus 30, which is a detection value of the voltage sensor 70 (S13).

If the detection value of the voltage sensor 70 is higher than the reference voltage $V_1$, the high voltage DC-DC converter 21 and the high voltage battery 20 are operated in a normal manner to start the fuel cell 10. In particular, the voltage of the high voltage battery 20 is boosted by the high voltage DC-DC converter 21 to drive the air blower 40 in a state where hydrogen as a fuel is supplied to the fuel cell 10 through the hydrogen supply valve, thereby starting the fuel cell 10 in a normal manner.

Then, when the fuel cell 10 has been started, the vehicle is driven in a hybrid mode in which the fuel cell 10 is used as a main power source and the high voltage battery 20 is used as an auxiliary power source (S15).

On the other hand, if the detection value of the voltage sensor 70 is lower than the reference voltage $V_1$, the controller 60 determines that there is a failure or malfunction in the high voltage DC-DC converter 21 or the high voltage battery 20. The controller 60 then outputs a control signal for turning on the first and second switches 32 and 35 (S14). When the first and second switches 32 and 35 are turned on, the air blower 40 is driven weakly by the voltage of the low voltage battery 50 (e.g., 12 V auxiliary battery) (S16). As a result, air is supplied to the fuel cell 10 to thereby start the fuel cell 10.

As such, if air is supplied to the fuel cell 10 by the operation of the air blower 40, the fuel cell 10 generates current by a reaction between hydrogen and oxygen in the air. Then, if a voltage above a predetermined level is output from the fuel cell 10, (i.e. if the voltage of the high voltage bus 30 as the detection value of the voltage sensor 70) exceeds the reference voltage $V_2$ (S17), then the controller 60 outputs a control signal for turning off the first and second switches 32 and 35 (S18).

Therefore, according to system and method of the present invention, it is possible to drive the air blower by the voltage of the low voltage battery even in the event of a failure or malfunction of the high voltage DC-DC converter or the high voltage battery. It is thus possible to start the fuel cell, thereby driving the vehicle in a limp home mode if the vehicle is driven only by the power of the fuel cell. Beneficially, according to the present invention, even in the event of a failure or malfunction of the high voltage system (such as the high voltage DC-DC converter, the high voltage battery, etc.), it is possible to supply necessary air to the fuel cell by weakly driving the air blower by the voltage of the low voltage battery, and thus it is possible to start the fuel cell. Therefore, the present systems and methods improve the reliability of the fuel cell system by solving the problems of conventional systems and methods, which depend only on the high voltage power.

As described above, according to the system and method of the present invention for starting a fuel cell vehicle in an emergency, the air blower is driven by the voltage of the low voltage battery to start the fuel cell in the event of a failure or malfunction of the high voltage system (including the high voltage DC-DC converter and the high voltage battery) during start-up of the fuel cell, thereby improving the reliability of the fuel cell system.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for starting a fuel cell vehicle in an emergency, the method comprising:
   if a start-up of a fuel cell system is detected, by a computer-implemented controller, determining, via a failure detector, whether there is a malfunction in a high voltage system, the high voltage system including a high voltage DC/DC converter and a high voltage battery;
   if it is determined that there is a failure or malfunction in the high voltage system, turning on by the computer-implemented controller, a switch provided in a circuit between an output terminal of a low voltage battery and an air blower, such that the air blower is driven by a voltage output from the low voltage battery; and
   supplying air to a fuel cell by driving the air blower according to the voltage applied from the low voltage battery,
   wherein the failure detector detects a voltage output from the high voltage system to the air blower via a voltage sensor provided in a high voltage bus;
   wherein the controller determines that the high voltage system is a failure and turns on the first and second switches, if the voltage of the high voltage bus detected by the voltage sensor is lower than a predetermined reference voltage V1;
   wherein the controller determines that the high voltage system is not a failure and maintains the first and second switches, if the voltage of the high voltage bus detected by the voltage sensor is higher than the reference voltage V1.

2. The method of claim 1, wherein the method further comprises:
   turning off, by the computer implemented controller, the first and second switches via the controller when the detected voltage value of the voltage sensor exceeds a predetermined reference voltage V2.

* * * * *